United States Patent
Son et al.

(10) Patent No.: US 12,285,720 B2
(45) Date of Patent: Apr. 29, 2025

(54) NON-THERMAL PLASMA-BASED EXHAUST GAS PARTICULATE MATTER REDUCTION APPARATUS FOR PREVENTING ARCING PHENOMENON

(71) Applicant: THE PRIME SOLUTION L.L.C., Seoul (KR)

(72) Inventors: Chang Soo Son, Seoul (KR); Jae Sun Yang, Gyeonggi-do (KR)

(73) Assignee: THE PRIME SOLUTION L.L.C., Seoul (KR)

( * ) Notice: Subject to any disclaimer, the term of this patent is extended or adjusted under 35 U.S.C. 154(b) by 843 days.

(21) Appl. No.: 17/599,669

(22) PCT Filed: Apr. 9, 2019

(86) PCT No.: PCT/KR2019/004240
§ 371 (c)(1),
(2) Date: Sep. 29, 2021

(87) PCT Pub. No.: WO2020/204243
PCT Pub. Date: Oct. 8, 2020

(65) Prior Publication Data
US 2022/0161188 A1    May 26, 2022

(30) Foreign Application Priority Data
Mar. 29, 2019  (KR) .................. 10-2019-0036548

(51) Int. Cl.
*B01D 53/32* (2006.01)
*F01N 3/027* (2006.01)
(Continued)

(52) U.S. Cl.
CPC .............. *B01D 53/32* (2013.01); *F01N 3/027* (2013.01); *F01N 3/0275* (2013.01); *F01N 3/035* (2013.01);
(Continued)

(58) Field of Classification Search
CPC ..... B01D 53/32; B01D 2259/818; F01N 3/01; F01N 3/027; F01N 3/0275; F01N 3/035;
(Continued)

(56) References Cited

U.S. PATENT DOCUMENTS

| | | | |
|---|---|---|---|
| 6,436,170 B1 * | 8/2002 | McDermott | B03C 3/41 96/28 |
| 6,883,306 B2 * | 4/2005 | Kim | F01N 3/0892 60/275 |

(Continued)

FOREIGN PATENT DOCUMENTS

| | | | |
|---|---|---|---|
| JP | 2005240634 A | * | 9/2005 |
| JP | 2009-030608 A | | 2/2009 |

(Continued)

OTHER PUBLICATIONS

International Search Report from corresponding PCT Application No. PCT/KR2019/004240, dated Dec. 27, 2019.

*Primary Examiner* — Loren C Edwards
(74) *Attorney, Agent, or Firm* — Harness, Dickey & Pierce, P.L.C.

(57) ABSTRACT

Disclosed is a nonthermal plasma-based exhaust gas particulate matter reduction apparatus for preventing an arcing phenomenon, the apparatus comprising: a chamber which is a tubular body having exhaust gas flowing therein and is connected to a ground power supply; a power supply device which is disposed outside the chamber and includes a voltage generation unit for generating a steady-state voltage at which maximum efficiency of a nonthermal plasma phenomenon is generated; an emitter which is disposed inside the chamber and generates nonthermal plasma between the chamber by having the steady-state voltage applied thereto; a rod which applies the steady-state voltage to the emitter by electrically connecting the voltage generation unit and the emitter; and an arcing prevention unit which prevents an (Continued)

arcing phenomenon from occurring between the rod and the chamber by providing insulation between the rod and the chamber.

12 Claims, 29 Drawing Sheets

(51) Int. Cl.
    *F01N 3/035*     (2006.01)
    *F01N 3/28*     (2006.01)
    *F01N 9/00*     (2006.01)
    *H05H 1/24*     (2006.01)

(52) U.S. Cl.
    CPC ............. *F01N 3/2803* (2013.01); *F01N 9/00* (2013.01); *H05H 1/24* (2013.01); *F01N 2240/28* (2013.01); *H05H 2245/17* (2021.05)

(58) Field of Classification Search
    CPC ........ F01N 3/0892; F01N 3/2803; F01N 9/00; F01N 2240/28; H05H 1/24; H05H 2245/17

See application file for complete search history.

(56) References Cited

U.S. PATENT DOCUMENTS

| | | | |
|---|---|---|---|
| 2002/0122751 A1* | 9/2002 | Sinaiko | B01D 53/32 422/186 |
| 2006/0048506 A1* | 3/2006 | Son | F01N 3/2086 60/297 |
| 2009/0241775 A1* | 10/2009 | Ogut | F01N 3/38 95/59 |
| 2011/0315891 A1 | 12/2011 | Ogut et al. | |

FOREIGN PATENT DOCUMENTS

| | | | | |
|---|---|---|---|---|
| KR | 10-2011-0009659 A | 1/2011 | | |
| KR | 10-1934100 B1 | 3/2019 | | |
| KR | 1934100 B1 * | 3/2019 | ............ | B01D 53/32 |

* cited by examiner

NON-THERMAL PLASMA-BASED EXHAUST GAS PARTICULATE MATTER REDUCTION APPARATUS FOR PREVENTING ARCING PHENOMENON

CROSS-REFERENCE TO RELATED APPLICATIONS

This application is a national phase application of PCT Application No. PCT/KR2019/004240, filed on 9 Apr. 2019, which claims priority to Korean Patent Application No. 10-2019-0036548, filed on 29 Mar. 2019. The entire disclosures of the applications identified in this paragraph are incorporated herein by reference.

TECHNICAL FIELD

The present disclosure relates to a nonthermal plasma-based exhaust gas particulate matter reduction apparatus for preventing an arcing phenomenon, and more particularly, to a nonthermal plasma-based exhaust gas particulate matter reduction apparatus for preventing an arcing phenomenon capable of preventing an arcing phenomenon from occurring between a rod and a chamber, suppressing a persistent situation of the arcing phenomenon, and lowering a fatigue and an arcing phenomenon occurrence probability of one or a plurality of power supply devices while maintaining the reduction efficiency of particulate matters at high efficiency.

BACKGROUND ART

This section provides background information related to the present disclosure which is not necessarily prior art.

An internal combustion engine receiving fuel from fossil fuels such as gasoline, LPG diesel, etc. is a major cause of environmental pollution that affects the entire environment as well as human health and life.

Carbon monoxide (CO), nitrogen oxide (NOx), sulfur dioxide ($SO_2$), nonmethane hydrocarbon (NMHC), and particulate matters (PM) are generated as a result of incomplete combustion of an internal combustion engine such as a gasoline or diesel engine.

Despite regulations for decades, contaminants such as the materials are continuously emitted in the environment in a quantity that exceeds the regulation standard even in countries with strict emission control.

Moreover, even currently, it is difficult to obtain a firm technology for the standard.

One technique of providing a great possibility to reduce the emission of the combustion engine, especially the emission of particulate matters is to improve combustion efficiency using nonthermal plasma (NTP), and reduce the emission of contaminants of exhaust gas.

In a study on the combustion efficiency, it has been reported that the NTP may be used to more easily and completely divide a large organic fuel molecule into smaller molecules, and for example, there are disclosed in US Patent Publication Nos. 2004/0185396, 2005/0019714, and 2008/0314734.

Meanwhile, in another study, it has been reported that the NTP may be used to directly reduce the emission of contaminants of the exhaust gas.

For example, many studies on the NTP relate to a system for reducing NOx emission, and for example, there are disclosed U.S. Pat. Nos. 6,482,368 and 6,852,200.

Meanwhile, other systems reduce particulate matters (PM) using the NTP. For example, there are disclosed U.S. Pat. No. 5,263,317 and US Patent Publication No. 2007/0045101.

A general particulate matter reduction apparatus of exhaust gas using NTP includes a chamber and an emitter as main components. The exhaust gas flows into the chamber which is a tubular body and the emitter is disposed inside the chamber. The chamber and the emitter are applied with a high voltage, so that an electrical discharge phenomenon occurs to emit electrons. The electrons emitted at a high speed collide with the particulate matters contained in the exhaust gas and the collided particulate matters are generated into plasma mixed with electrons, ions, and neutral particles.

The high voltage applied to the chamber and the emitter needs to be applied to the chamber and the emitter without leakage. When the high voltage is leaked, the voltage between the emitter and the chamber is reduced so that the plasma efficiency may be rapidly reduced.

Particularly, when an arcing phenomenon occurs between the rod and the chamber, a discharge phenomenon in the emitter is weakened so that the NTP generation efficiency is rapidly reduced. Further, due to an unnecessary arcing phenomenon, the damage on the surface of the chamber and the rod may be generated. In addition, due to the aforementioned problem, the efficiency is lowered and the damage is generated, and in addition, a power supply device generating the high voltage has a problem that the fatigue is continuously increased.

SUMMARY

Technical Problem

An object of the present disclosure is to provide a nonthermal plasma-based exhaust gas particulate matter reduction apparatus for preventing an arching phenomenon capable of preventing an arching phenomenon from occurring between a rod and a chamber by providing an arcing prevention unit for insulating the road and the chamber from each other.

Another object of the present disclosure is to provide a nonthermal plasma-based exhaust gas particulate matter reduction apparatus for preventing an arching phenomenon capable of suppressing a persistent situation of the arching phenomenon by providing a control unit for controlling a power supply device to generate a minimum voltage at which a nonthermal plasma phenomenon occurs.

Yet another object of the present disclosure is to provide a nonthermal plasma-based exhaust gas particulate matter reduction apparatus for preventing an arching phenomenon capable of reducing a fatigue and an arcing phenomenon occurrence probability of one or a plurality of power supply devices even while maintaining particulate matter reduction efficiency at high efficiency by providing a multiple plasma generation unit, a multiple voltage application unit, and a power supply device.

Technical Solution

This section provides a general summary of the disclosure and is not a comprehensive disclosure of its full scope or all of its features.

According to any aspect of many aspects of the present disclosure, there is provided a nonthermal plasma-based exhaust gas particulate matter reduction apparatus for preventing an arcing phenomenon, the apparatus including: a chamber which is a tubular body having exhaust gas flowing therein and is connected to a ground power supply; a power supply device which is disposed outside the chamber and includes a voltage generation unit for generating a steady-state voltage at which maximum efficiency of a nonthermal plasma phenomenon is generated; an emitter which is disposed inside the chamber and generates nonthermal plasma between the chamber by having the steady-state voltage applied thereto; a rod which applies the steady-state voltage to the emitter by electrically connecting the voltage generation unit and the emitter; and an arcing prevention unit which prevents an arcing phenomenon from occurring between the rod and the chamber by providing insulation between the rod and the chamber.

In the nonthermal plasma-based exhaust gas particulate matter reduction apparatus for preventing the arcing phenomenon according to another aspect of the present disclosure, the arcing prevention unit may be made of an insulation material and may be a rod isolation means in which the rod is disposed therein.

In the nonthermal plasma-based exhaust gas particulate matter reduction apparatus for preventing the arcing phenomenon according to yet another aspect of the present disclosure, the rod isolation means may be an insulation coating member which coats an outer surface of the rod to insulate the inner and outer portions thereof.

In the nonthermal plasma-based exhaust gas particulate matter reduction apparatus for preventing the arcing phenomenon according to yet another aspect of the present disclosure, the rod isolation means may include the rod therein, be provided as an insulator, and may be a linear or curved column of which a cross-sectional shape is at least one of a polygon, a circle, an oval and a polygon having a round vertex.

In the nonthermal plasma-based exhaust gas particulate matter reduction apparatus for preventing the arcing phenomenon according to another aspect of the present disclosure, the arcing prevention unit may be made of an insulation material and may be disposed on an inner surface or outer surface of the chamber or disposed in a chamber window formed through the chamber.

In the nonthermal plasma-based exhaust gas particulate matter reduction apparatus for preventing the arcing phenomenon according to yet another aspect of the present disclosure, the arcing prevention unit may be an insulation film coated on the inner surface of the chamber to include an orthogonal projection of the rod on the inner surface of the chamber.

In the nonthermal plasma-based exhaust gas particulate matter reduction apparatus for preventing the arcing phenomenon according to yet another aspect of the present disclosure, the arcing prevention unit may be an insulation pipe disposed to be in close contact with the inner surface of the chamber to include a longitudinal projection of the rod on the inner surface of the chamber.

In the nonthermal plasma-based exhaust gas particulate matter reduction apparatus for preventing the arcing phenomenon according to another aspect of the present disclosure, the chamber may be provided with a length including an orthogonal projection of the emitter on the inner surface of the chamber, and the arcing prevention unit may be provided with an insulation pipe made of an insulation material, and the chamber may be inserted and disposed into the arcing prevention unit, but disposed at a position facing the emitter of the inner surface of the chamber.

In the nonthermal plasma-based exhaust gas particulate matter reduction apparatus for preventing the arcing phenomenon according to yet another aspect of many aspects of the present disclosure, the power supply device may include a control unit controlling the voltage generation unit, and the control unit may control the voltage generation unit to operate in an arcing suppression mode of mitigating the arcing occurrence by generating a minimum voltage at which a nonthermal plasma phenomenon occurs between the emitter and the chamber.

In the nonthermal plasma-based exhaust gas particulate matter reduction apparatus for preventing the arcing phenomenon according to yet another aspect of many aspects of the present disclosure, the power supply device may further include an arcing sensing means which senses the arcing phenomenon to generate an arcing occurrence signal, and the control unit may control the voltage generation unit to operate in the arcing suppression mode according to the arcing occurrence signal.

The nonthermal plasma-based exhaust gas particulate matter reduction apparatus for preventing the arcing phenomenon according to another aspect of many aspects of the present disclosure may further include a plasma generation unit consisting of the rod and the emitter; a multiple plasma generation unit in which a plurality of plasma generation units is disposed; and a multiple voltage application unit which controls the magnitude of a voltage applied to the plurality of plasma generation units configuring the multiple plasma generation unit.

In the nonthermal plasma-based exhaust gas particulate matter reduction apparatus for preventing the arcing phenomenon according to yet another aspect of many aspects of the present disclosure, the plurality of power supply devices may be provided, and may be provided so that the power supply devices and the plasma generation units are electrically connected to each other one by one or one power supply device and the plurality of plasma generation units are electrically connected to each other.

In the nonthermal plasma-based exhaust gas particulate matter reduction apparatus for preventing the arcing phenomenon according to yet another aspect of many aspects of the present disclosure, one side of the multiple voltage application unit may be connected with one power supply device and the other side thereof may be connected with the multiple plasma generation unit.

In the nonthermal plasma-based exhaust gas particulate matter reduction apparatus for preventing the arcing phenomenon according to yet another aspect of many aspects of the present disclosure, the multiple voltage application unit may be connected to one side of the power supply device and the multiple plasma generation unit may be connected to the other side of the power supply device.

In the nonthermal plasma-based exhaust gas particulate matter reduction apparatus for preventing the arcing phenomenon according to yet another aspect of many aspects of the present disclosure, the multiple voltage application unit may further include a voltage transformation unit which receives the steady-state voltage from the power supply device to transform the voltage into the minimum voltage.

In the nonthermal plasma-based exhaust gas particulate matter reduction apparatus for preventing the arcing phenomenon according to yet another aspect of many aspects of the present disclosure, the surface of the arcing prevention unit may be coated with a photocatalyst to interfere with the adsorption of fine soot included in the exhaust gas by reacting with ultraviolet rays emitted from the nonthermal plasma.

In the nonthermal plasma-based exhaust gas particulate matter reduction apparatus for preventing the arcing phenomenon according to yet another aspect of the present disclosure, the surface of the arcing prevention unit may be coated with an anti-chemical modification coating agent to prevent the arcing prevention unit from being modified due to a chemical reaction with a contaminant in the exhaust gas.

Advantageous Effects

According to the present disclosure, it is possible to prevent an arcing phenomenon from occurring between a rod and a chamber by providing an arcing prevention unit for insulating the rod and the chamber from each other.

According to the present disclosure, it is possible to suppress a persistent situation of the arcing phenomenon by providing a control unit for controlling a voltage generation unit to generate a minimum voltage at which the nonthermal plasma phenomenon occurs.

According to the present disclosure, it is possible to reduce a fatigue and an arcing phenomenon occurrence probability of one or a plurality of power supply devices even while maintaining particulate matter reduction efficiency at high efficiency by providing a multiple plasma generation unit and a multiple voltage application unit.

DETAILED DESCRIPTION

Hereinafter, a specific embodiment of a nonthermal plasma-based exhaust gas particulate matter reduction apparatus for preventing an arcing phenomenon according to the present disclosure will be described in detail with reference to the accompanying drawings.

However, the intrinsic technical idea of the present disclosure cannot be limited to embodiments to be described below, and embodiments to be described below may cover a range which can be easily proposed by those skilled in the art by substitutions or changes based on the intrinsic technical idea of the present disclosure.

Further, since the terms to be used below are selected for easy description, the terms are not limited to dictionary meanings and should be appropriately interpreted as meanings consistent with the technical idea of the present disclosure in order to grasp the intrinsic technical idea of the present disclosure.

Figure 1:
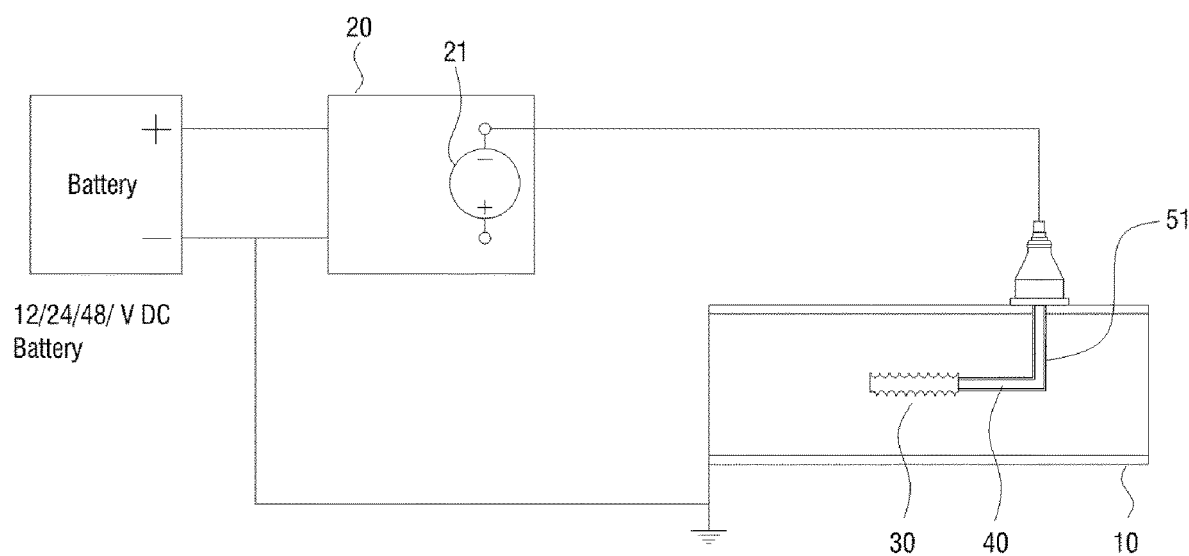
FIG. 1 is a diagram showing an embodiment of a nonthermal plasma-based exhaust gas particulate matter reduction apparatus for preventing an arcing phenomenon according to the present disclosure.
Figure 2:
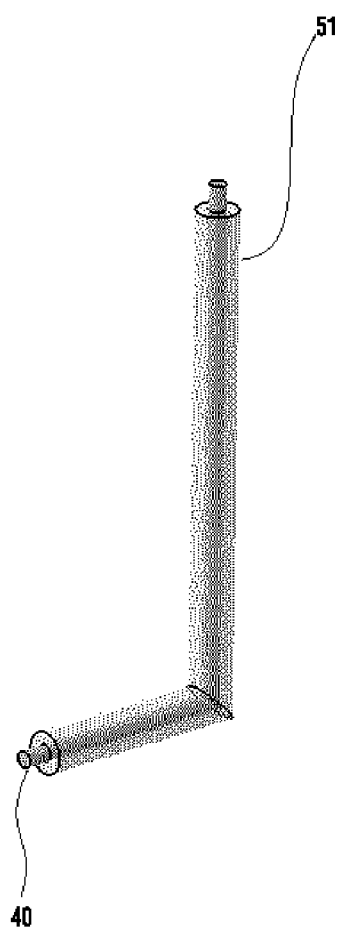
FIGS. 2, 3, 4 and 5 are diagrams enlarging a rod and a rod isolation means of FIG. 1.
Figure 3:
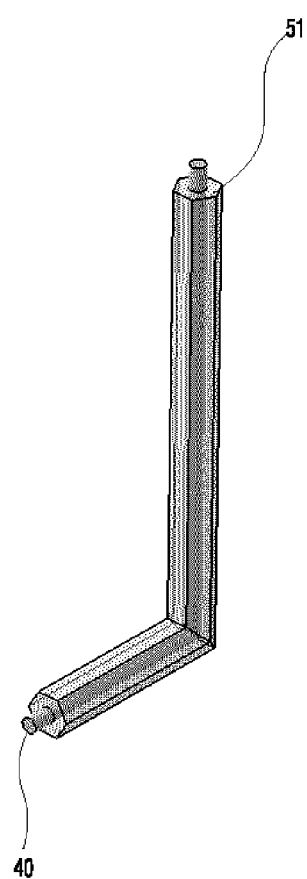
Figure 4:
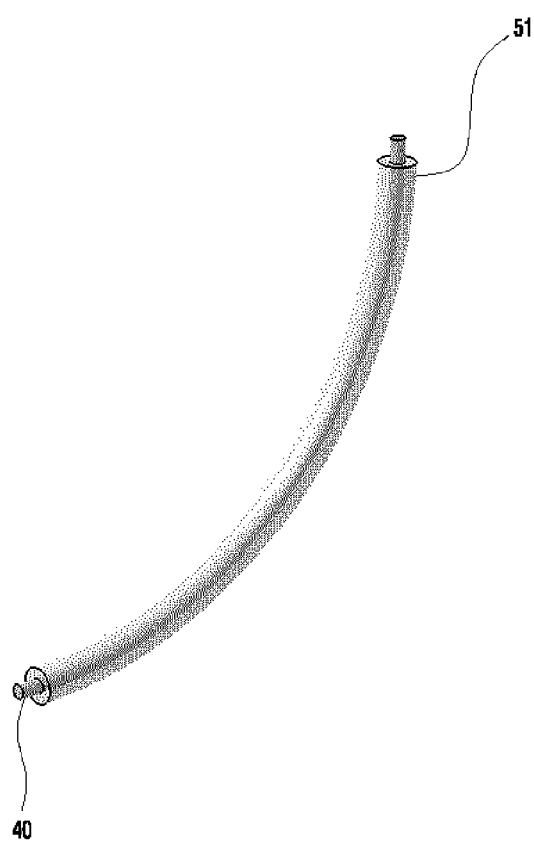
Figure 5:
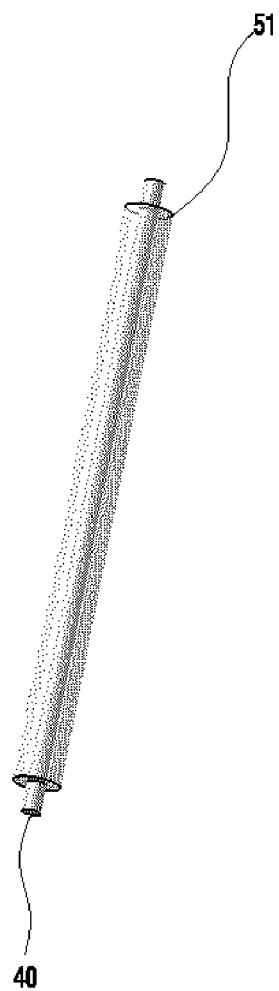
Figure 6:
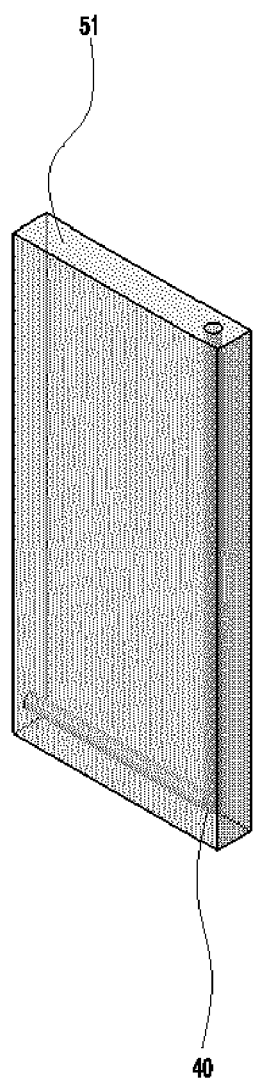
FIGS. 6, 7, 8 and 9 are diagrams showing another modification of the rod isolation means in the nonthermal plasma-based exhaust gas particulate matter reduction apparatus for preventing the arcing phenomenon according to the present disclosure.
Figure 7:
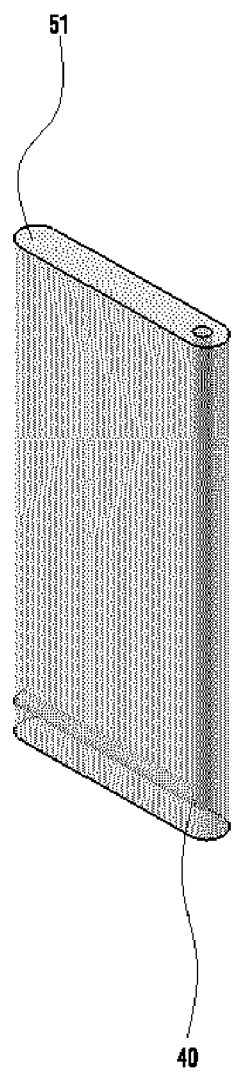
Figure 8:
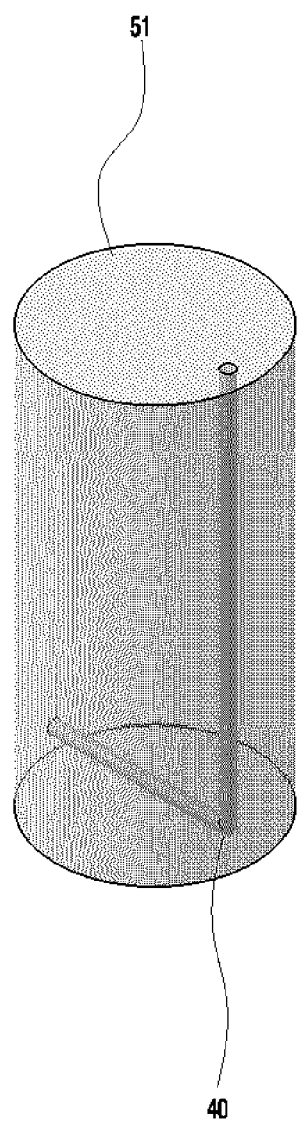
Figure 9:
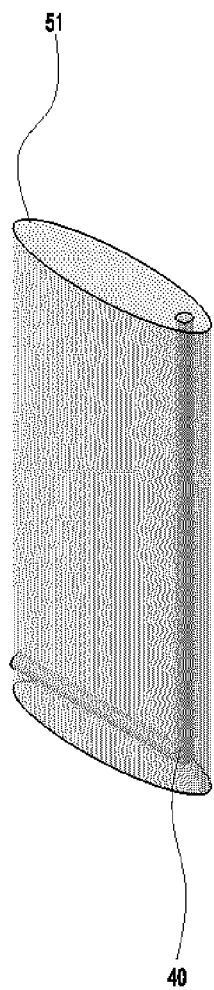
Figure 10:
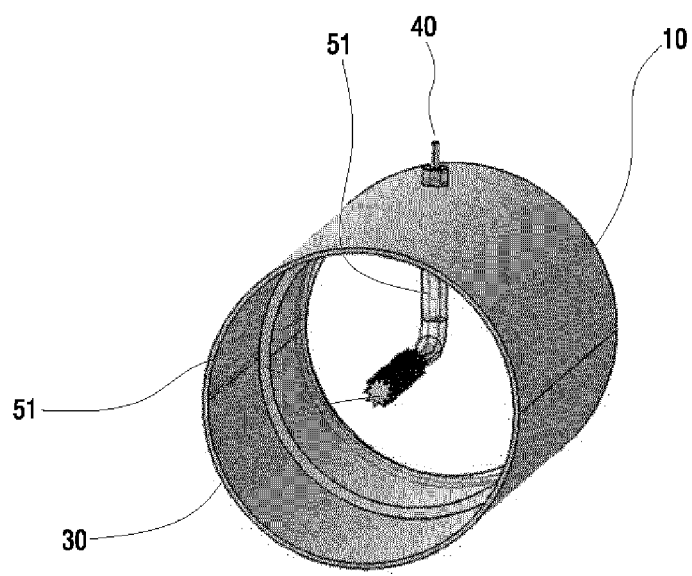
FIGS. 10, 11, 12, 13, 14, 15, 16 and 17 are diagrams showing various modifications of a chamber inner surface isolation means in the nonthermal plasma-based exhaust gas particulate matter reduction apparatus for preventing the arcing phenomenon according to the present disclosure.
Figure 11:
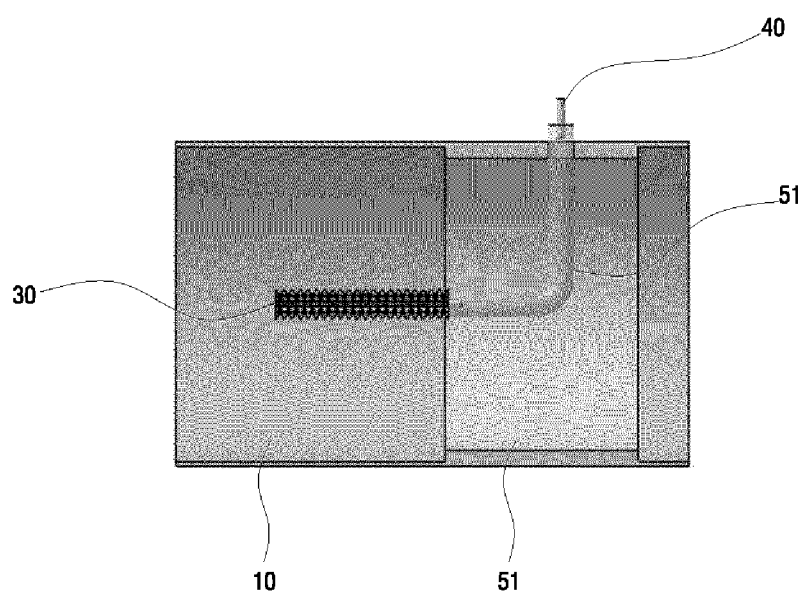
Figure 12:
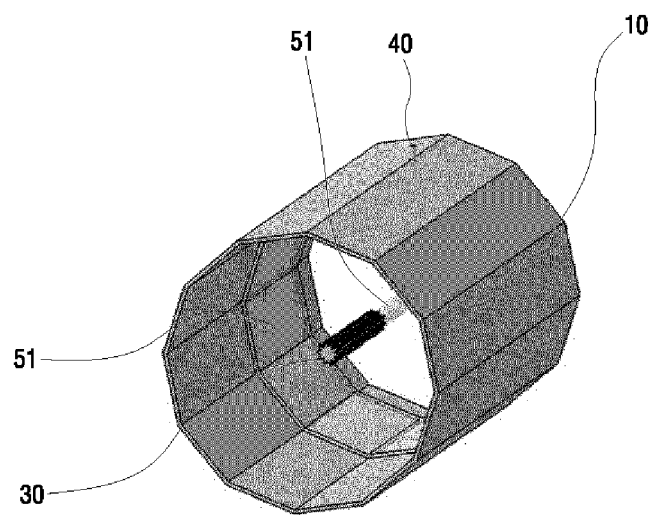
Figure 13:
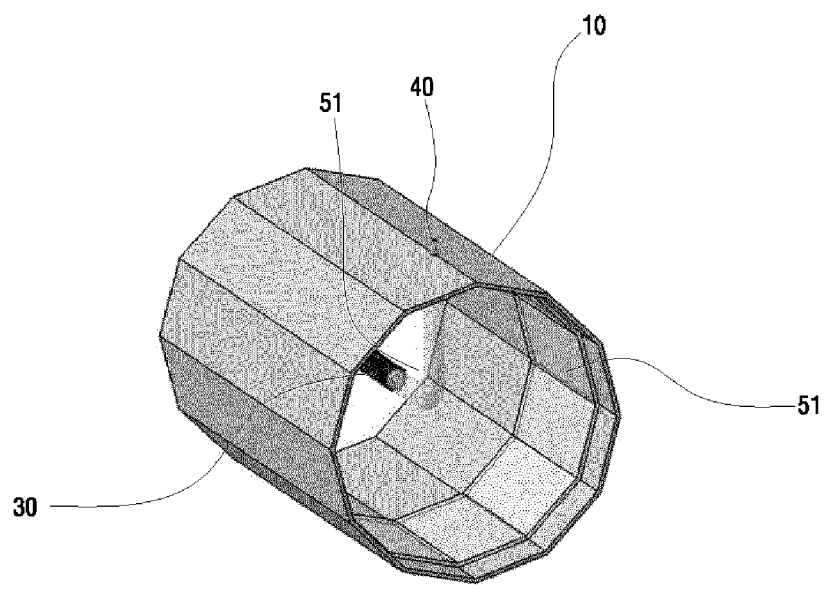
Figure 14:
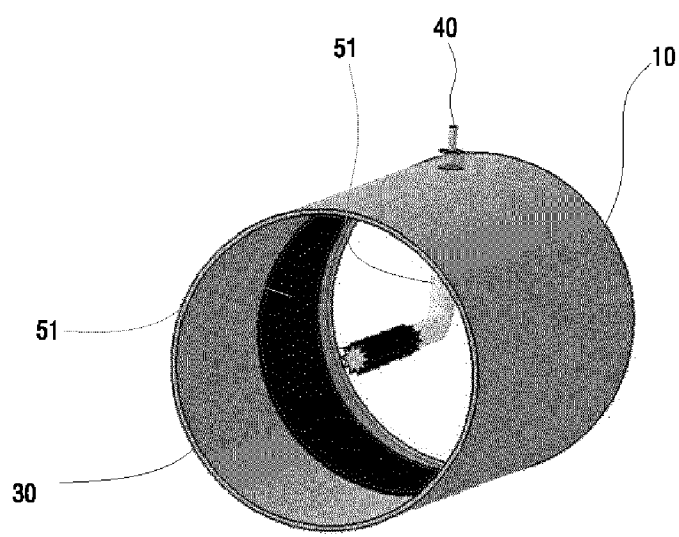
Figure 15:
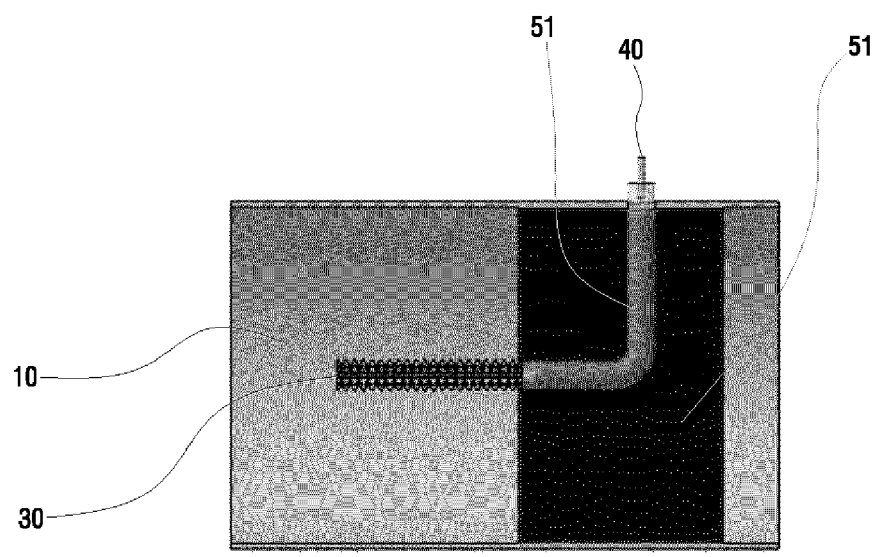
Figure 16:
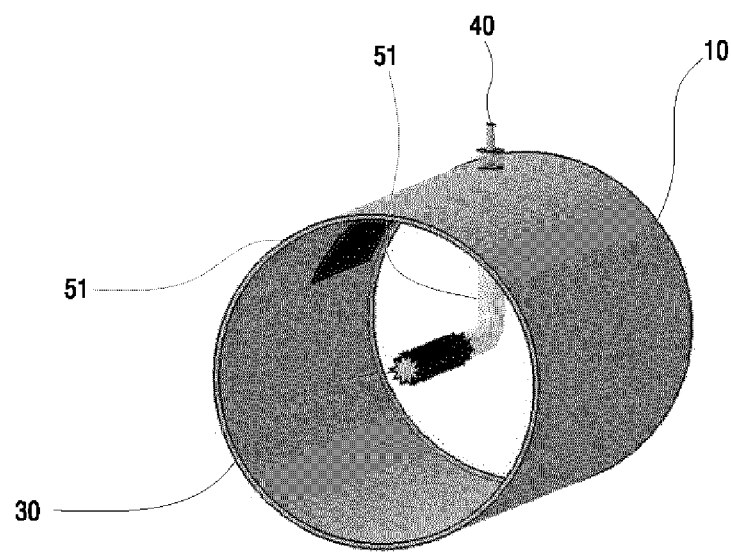
Figure 17:
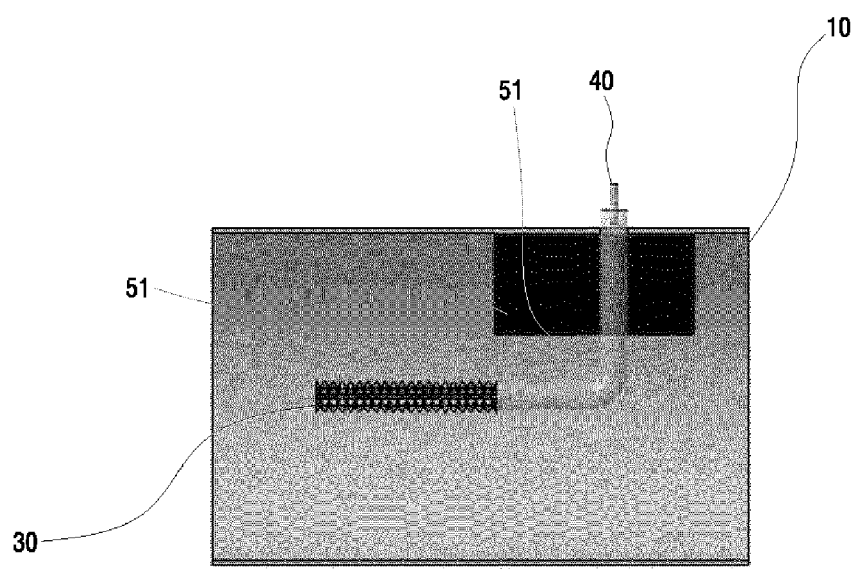

FIG. 1 is a diagram showing an embodiment of a nonthermal plasma-based exhaust gas particulate matter reduction apparatus for preventing an arcing phenomenon according to the present disclosure and FIGS. 2 to 5 are diagrams enlarging a rod and a rod isolation means of FIG. 1. In addition, FIGS. 6 to 9 are diagrams showing a modification of the rod isolation means in the nonthermal plasma-based exhaust gas particulate matter reduction apparatus for preventing the arcing phenomenon according to the present disclosure.

Referring to FIG. 1, the nonthermal plasma-based exhaust gas particulate matter reduction apparatus for preventing the arcing phenomenon according to the present disclosure includes a chamber 10, a power supply device 20, an emitter 30, a rod 40, and an arcing prevention unit 51.

The chamber 10 is a tubular body in which exhaust gas flows and is connected with a ground power supply.

The power supply device 20 is disposed outside the chamber 10 and includes a voltage generation unit 21 generating a steady-state voltage. The steady-state voltage is a voltage at which maximum efficiency of a nonthermal plasma phenomenon is generated.

It is preferable in particulate matter reduction efficiency that the steady-state voltage has a negative (−) value and is applied at a DC voltage.

The emitter 30 is disposed inside the chamber 10 and applied with the steady-state voltage to generate nonthermal plasma between the emitter and the chamber 10.

It is preferred that the emitter 30 is located in the center of a vertical cross-section of the chamber 10 and is disposed in parallel to a longitudinal direction of the chamber 10. This is because it is effective in producing uniform nonthermal plasma inside the chamber 10.

The rod 40 electrically connects the power supply device 20 and the emitter 30 to apply the steady-state voltage to the emitter 30.

The arcing prevention unit 51 isolates the rod 40 and the chamber 10 from each other to prevent an arcing phenomenon from occurring between the rod 40 and the chamber 10.

That is, the nonthermal plasma-based exhaust gas particulate matter reduction apparatus for preventing the arcing phenomenon according to the present disclosure electrically isolates the rod 40 and the chamber 10 from each other to suppress and prevent a discharge phenomenon therebetween.

Referring to FIGS. 1 to 9, in the nonthermal plasma-based exhaust gas particulate matter reduction apparatus for preventing the arcing phenomenon according to the embodiment, the arcing prevention unit 51 is made of an insulation material and is a rod isolation means in which the rod 40 is disposed therein.

The rod isolation means is preferably made of a material such as quartz glass.

This includes a case where a spacing is present between the inner surface of the rod isolation means in which the rod 40 is disposed and the rod.

In this case, even though the rod 40 is made of a soft material that is easily bent, or has a thin thickness, there is an assembly advantage to be inserted into the rod isolation means.

The rod isolation means covers the rod 40 to insulate the rod 40 and the chamber 10 from each other, thereby increasing electric resistance on a discharge path.

Referring to FIGS. 2 to 5, in the nonthermal plasma-based exhaust gas particulate matter reduction apparatus for preventing the arcing phenomenon according to the embodiment, the rod isolation means may be an insulation coating member which coats an outer surface of the rod 40 to insulate the inner and outer portions thereof.

Further, referring to FIGS. 6 to 9, in the nonthermal plasma-based exhaust gas particulate matter reduction apparatus for preventing the arcing phenomenon according to the embodiment, the rod isolation means is provided as an insulator and is a linear or curved column having various cross-sectional shapes in which the rod 40 is disposed therein. The cross-sectional shape is preferably at least one of a polygon, a circle, an oval and a polygon having a round vertex.

Meanwhile, on the surface of the arcing prevention unit including the rod isolation means, a photocatalyst reacting with ultraviolet rays emitted from nonthermal plasma may be coated. The photocatalyst prevents fine soot contained in exhaust gas from being adsorbed on the surface of the arcing prevention unit.

The fine soot is a mixture of various materials and functions like a lightning rod on the adsorption surface to induce an arcing phenomenon or increase an arcing occurrence frequency.

The arcing prevention unit coated with the photocatalyst allows an arcing prevention function by the photocatalyst to be continuously maintained.

Further, on the surface of the arcing prevention unit 51, an anti-chemical modification coating agent may be coated to prevent an insulator of the arcing prevention unit 51 from being modified due to a chemical reaction with a contaminant in the exhaust gas.

The anti-chemical modification coating agent may vary according to an insulator and enables permanent use of the insulator.

FIGS. 10 to 17 are diagrams showing various modifications of the arcing prevention unit 51 in the nonthermal plasma-based exhaust gas particulate matter reduction apparatus for preventing the arcing phenomenon according to the present disclosure.

First, referring to FIGS. 10 to 13, in the nonthermal plasma-based exhaust gas particulate matter reduction apparatus for preventing the arcing phenomenon according to the embodiment, the arcing prevention unit 51 may be an insulation pipe disposed to be in close contact with the inner surface of the chamber 10.

In the embodiment, the chamber 10 and the arcing prevention unit 51 may be a closed curve including a circular or oval cross section, or a polygon.

Referring to FIGS. 14 to 17, in the nonthermal plasma-based exhaust gas particulate matter reduction apparatus for preventing the arcing phenomenon according to the embodiment, the arcing prevention unit 51 may be an insulation film coated on the inner surface of the chamber 10.

Meanwhile, in the embodiment, the arcing preventing unit 51 may maximize an arcing prevention effect by doubly applying the rod isolation means described above.

Figure 18:
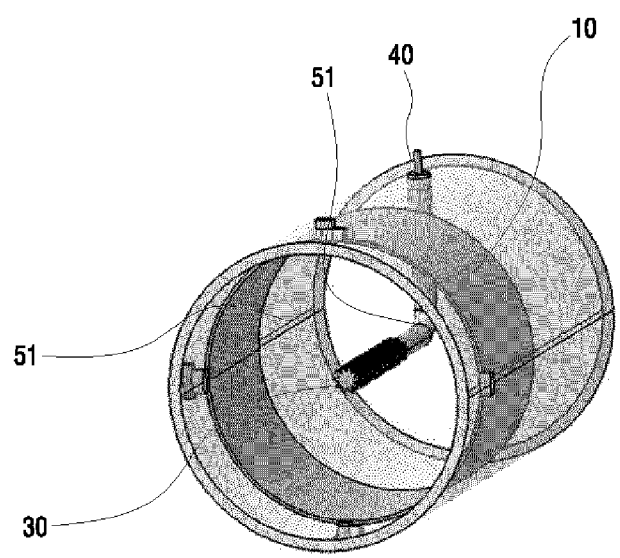
FIGS. 18 and 19 are diagrams illustrating an insulation pipe of yet another embodiment of the nonthermal plasma-based exhaust gas particulate matter reduction apparatus for preventing the arcing phenomenon according to the present disclosure.
Figure 19:
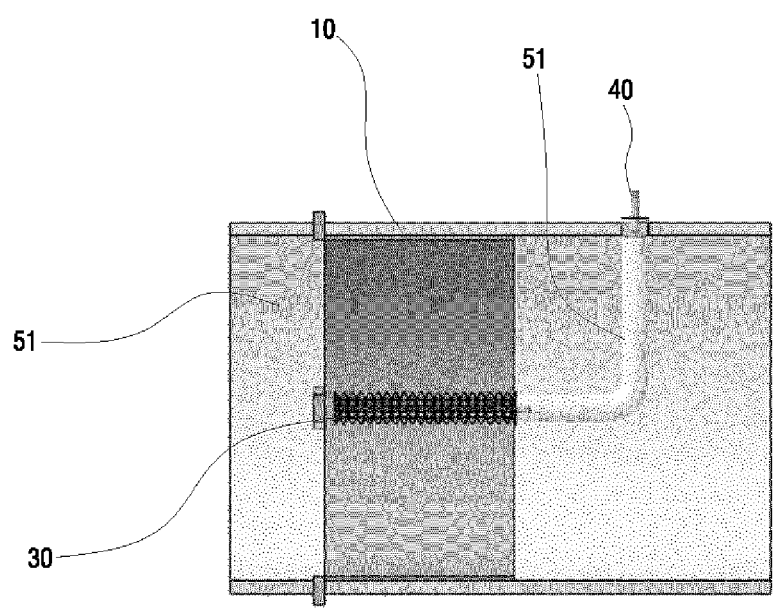

FIGS. 18 and 19 are diagrams illustrating an insulation pipe of yet another embodiment of the nonthermal plasma-based exhaust gas particulate matter reduction apparatus for preventing the arcing phenomenon according to the present disclosure.

Referring to FIGS. 18 and 19, in the nonthermal plasma-based exhaust gas particulate matter reduction apparatus for preventing the arcing phenomenon, the chamber 10 is provided with a length including an orthogonal projection of the emitter 30 on the inner surface of the chamber 10, the arcing prevention unit 51 is provided with an insulation pipe made of an insulation material, and the chamber 10 is inserted and disposed into the arcing prevention unit 51, but disposed at a position facing the emitter 30 of the inner surface of the chamber 10.

Accordingly, the emitter 30 and the chamber 10 are arranged at a shortest distance to increase a discharge possibility, while the rod 40 is spaced apart from the chamber 10 to lower the arcing phenomenon.

FIGS. 20 to 25 are diagrams showing yet another modification of the arcing prevention unit in the nonthermal plasma-based exhaust gas particulate matter reduction apparatus for preventing the arcing phenomenon according to the present disclosure.

Figure 20:
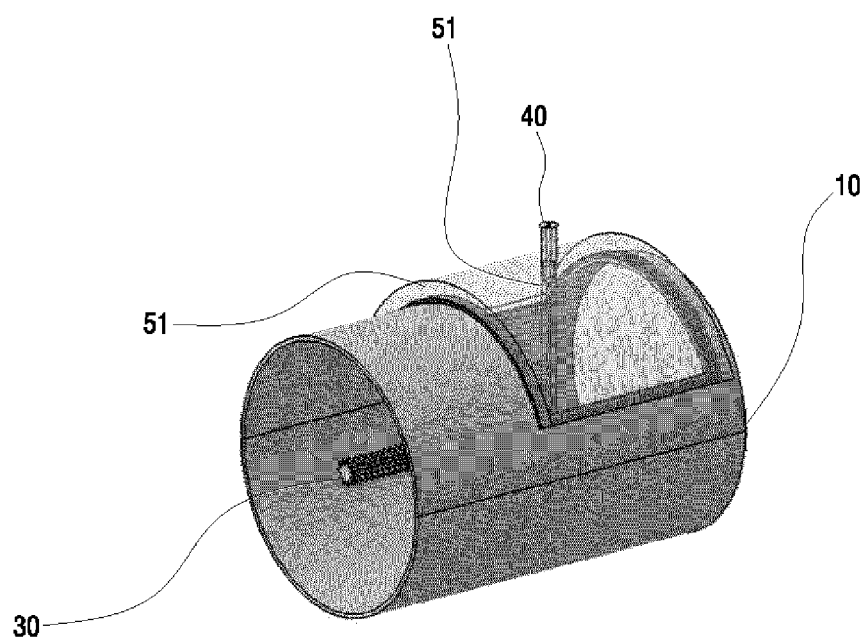
FIGS. 20, 21, 22, 23, 24 and 25 are diagrams showing yet another modification of an arcing prevention unit in the nonthermal plasma-based exhaust gas particulate matter reduction apparatus for preventing the arcing phenomenon according to the present disclosure.
Figure 21:
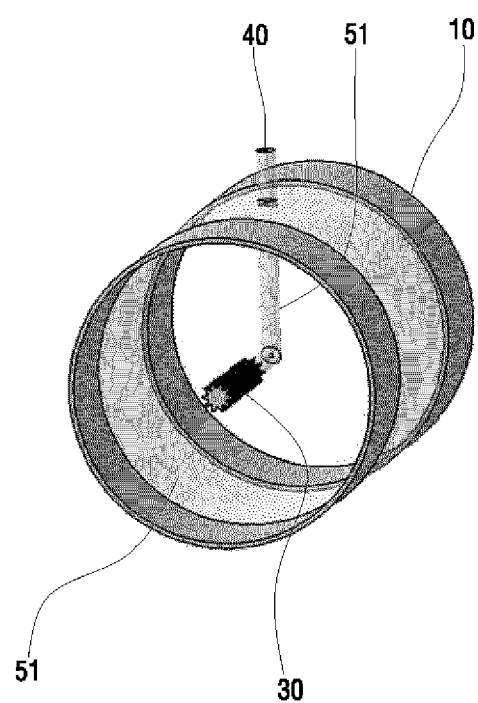
Figure 22:
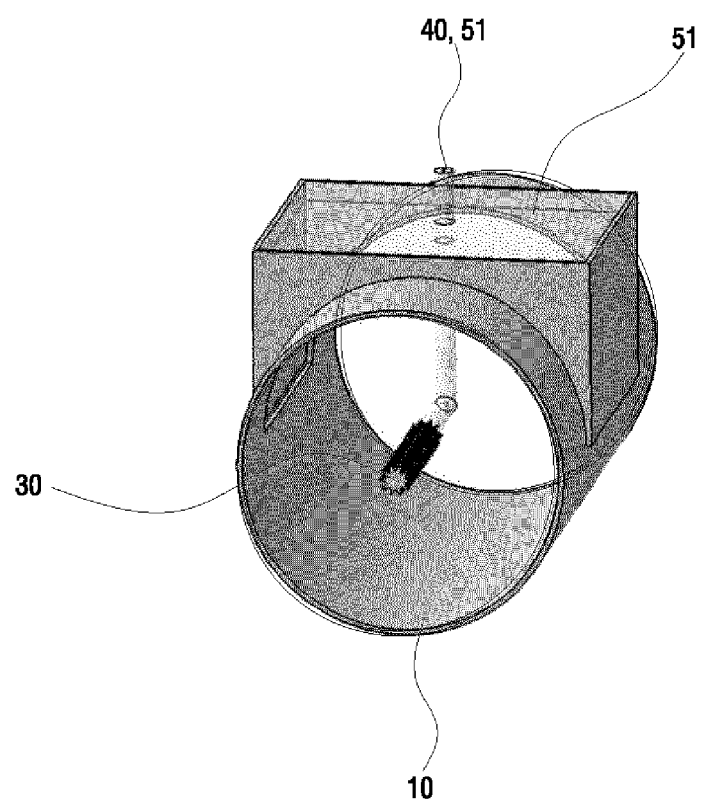
Figure 23:
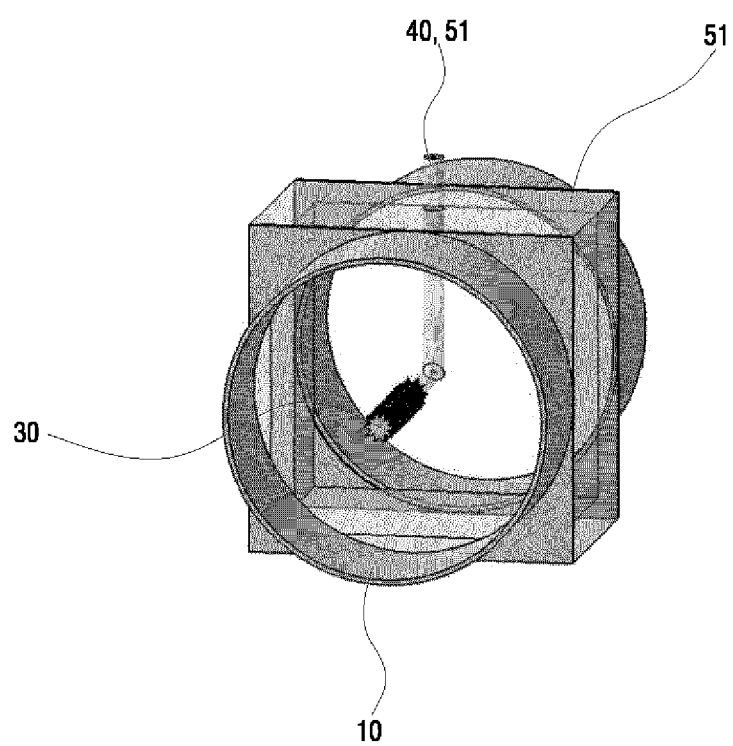
Figure 24:
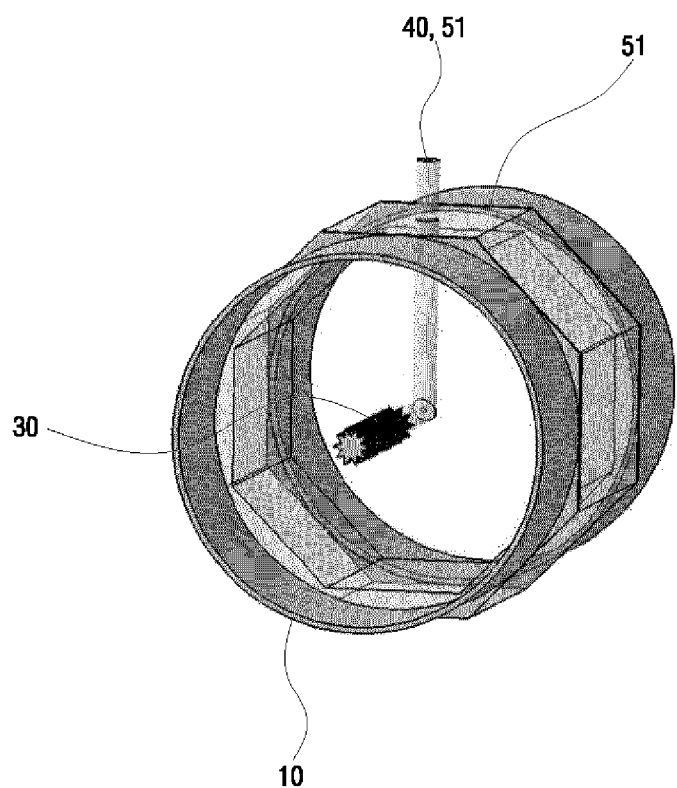
Figure 25:
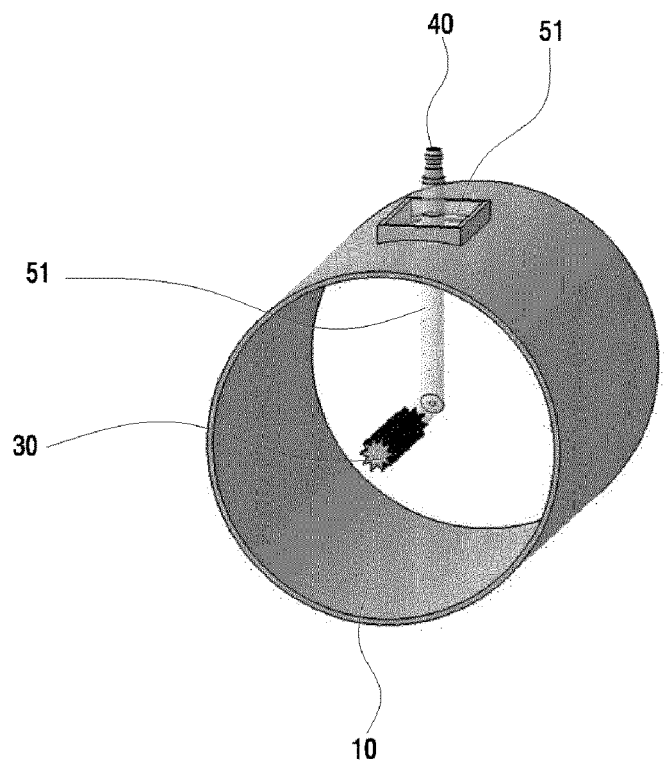

Referring to FIGS. 20 and 21, in the nonthermal plasma-based exhaust gas particulate matter reduction apparatus for preventing the arcing phenomenon according to the embodiment, the arcing prevention unit 51 is made of an insulation material and disposed to shield a chamber window formed through the chamber 10.

In the embodiment, the arcing prevention unit 51 is formed to include an orthogonal projection of the rod 40. The chamber window may be formed on an entire or a part of the circumference of the chamber 10.

When the chamber window is formed on the part of the circumference of the chamber 10, it is effective to prevent arcing that one side of the rod 40 is coupled to the arcing prevention unit 51.

Referring to FIGS. 22 to 25, in the nonthermal plasma-based exhaust gas particulate matter reduction apparatus for preventing the arcing phenomenon according to the embodiment, the arcing prevention unit 51 is provided in a flat plate including at least a polygon or circle, unlike FIGS. 20 and 21. Accordingly, costs for manufacturing the arcing prevention unit 51 are reduced.

Figure 26:
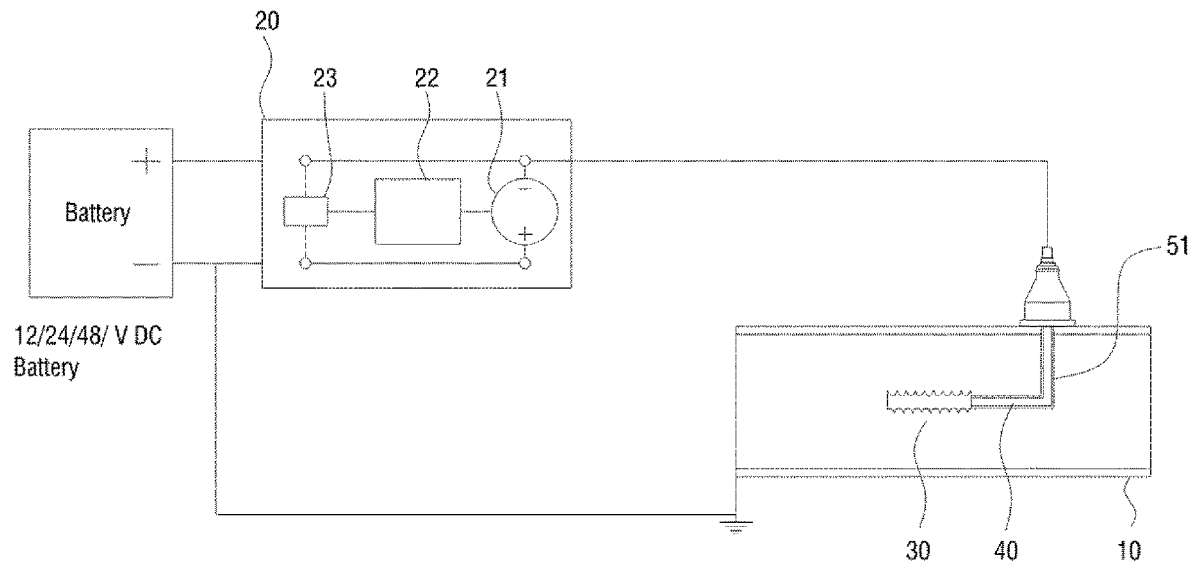
FIG. 26 is a diagram illustrating an embodiment including an arcing sensing means and a control unit of the nonthermal plasma-based exhaust gas particulate matter reduction apparatus for preventing the arcing phenomenon according to the present disclosure.

FIG. 26 is a diagram describing an embodiment including an arcing sensing means and a control unit in the nonthermal plasma-based exhaust gas particulate matter reduction apparatus for preventing the arcing phenomenon according to the present disclosure.

Referring to FIG. 26, in the nonthermal plasma-based exhaust gas particulate matter reduction apparatus for preventing the arcing phenomenon according to the present disclosure, the power supply device 20 includes a control unit 22 controlling an operation of the voltage generation unit 21. Further, the control unit 22 has a function of controlling the voltage generation unit 21 to operate in an arcing suppression mode.

The arcing suppression mode is one of various operating modes of the voltage generation unit 21. In the arcing suppression mode state, the voltage generation unit 21 generates a minimum voltage or a voltage between the minimum voltage and the steady-state voltage at which the nonthermal plasma phenomenon occurs between the emitter 30 and the chamber 10.

That is, the magnitude of the voltage applied to the chamber 10 is reduced to prevent the arcing occurrence or to mitigate or remove pre-occurring arcing.

The control unit 22 may control the voltage generation unit 21 to operate regularly or irregularly in the arcing suppression mode. As a result, it is possible to prevent the arcing phenomenon in advance by selectively generating regularly or irregularly a voltage between the steady-state voltage and the minimum voltage or between the voltage between the minimum voltage and the steady-state voltage.

In addition, referring to FIG. 26, in the nonthermal plasma-based exhaust gas particulate matter reduction apparatus for preventing the arcing phenomenon according to the embodiment, the power supply device 20 further includes an arcing sensing means 23 which senses the arcing phenomenon to generate an arcing occurrence signal. At this time, the control unit 22 controls the voltage generation unit 21 to operate in the arcing suppression mode according to the arcing occurrence signal.

Further, the arcing sensing means 23 measures a voltage or current applied between the rod 40 or the emitter 30 and the chamber 10 in real time and analyzes a change in voltage or current over time to sense the arcing phenomenon.

When the nonthermal plasma generation state is stably maintained between the emitter 30 and the chamber 10, a temporal change in voltage or current therebetween may be stably maintained.

On the other hand, when the arcing phenomenon occurs, aperiodic and instantaneous voltage drop and a rapid rise of the current occur between the emitter 30 and the chamber 10.

The arcing sensing means 23 senses the instantaneous voltage drop and the rapid rise of the current in real time to generate the arcing occurrence signal.

Accordingly, the arcing sensing means 23 and the control unit 22 may organically operate to prevent a persistent situation of the arcing phenomenon.

Specifically, the control unit senses a current of a reference value or higher before the rapid rise of the current, determines the arcing state, and lowers setting values of the voltage and the current to be supplied from the power supply device 20 to prevent the persistence of the arcing.

When the mitigation or suppression of the arcing is confirmed, the setting values of the voltage and the current to be supplied from the power supply device 20 are restored again.

The control unit 22 may analyze a frequency per unit time of the arcing occurrence signal to generate arcing occurrence estimation information. The control unit 22 preemptively executes the arcing suppression mode regularly or irregularly based on the arcing occurrence estimation information when the arcing phenomenon does not occur, to prevent the arcing occurrence.

FIGS. 27 to 30 are diagrams illustrating various embodiments including a multiple voltage application unit of the nonthermal plasma-based exhaust gas particulate matter reduction apparatus for preventing the arcing phenomenon according to the present disclosure.

Referring to FIGS. 27 to 30, in the nonthermal plasma-based exhaust gas particulate matter reduction apparatus for preventing the arcing phenomenon according to the present disclosure, a plurality of power supply devices 20 is provided, a plurality of plasma generation units 70a, 70b, 70c, 70d, 70e, and 70f consisting of the rod 40 and the emitter 30 is provided, and a multiple plasma generation unit 70 and a multiple voltage application unit 60 may be further included.

The multiple plasma generation unit 70 refers to a plurality of plasma generation units.

The multiple voltage application unit 60 controls differently the magnitudes of voltages applied to the plurality of plasma generation units 70a, 70b, 70c, 70d, 70e, and 70f according to the occurrence of the arcing phenomenon or a pre-input user's instruction.

Referring to FIGS. 27 to 30, each of the plurality of plasma generation units 70a, 70b, 70c, 70d, 70e, and 70f separately serves a particulate matter reduction function using the plurality of plasma generation units 70a, 70b, 70c, 70d, 70e, and 70f.

Accordingly, a different magnitude of voltage is applied to each of the plurality of plasma generation units 70a, 70b, 70c, 70d, 70e, and 70f, thereby reducing the fatigue of the power supply device 20 while maintaining the particulate matter reduction function and extending the life thereof by preventing an overheating phenomenon.

The multiple voltage application unit 60 may be disposed at a front end of the power supply device 20 to control the power supply device 20. Alternately, the multiple voltage application unit 60 may be disposed at a rear end of the power supply device 20 to control a steady-state voltage generated from the power supply device 20.

Figure 27:
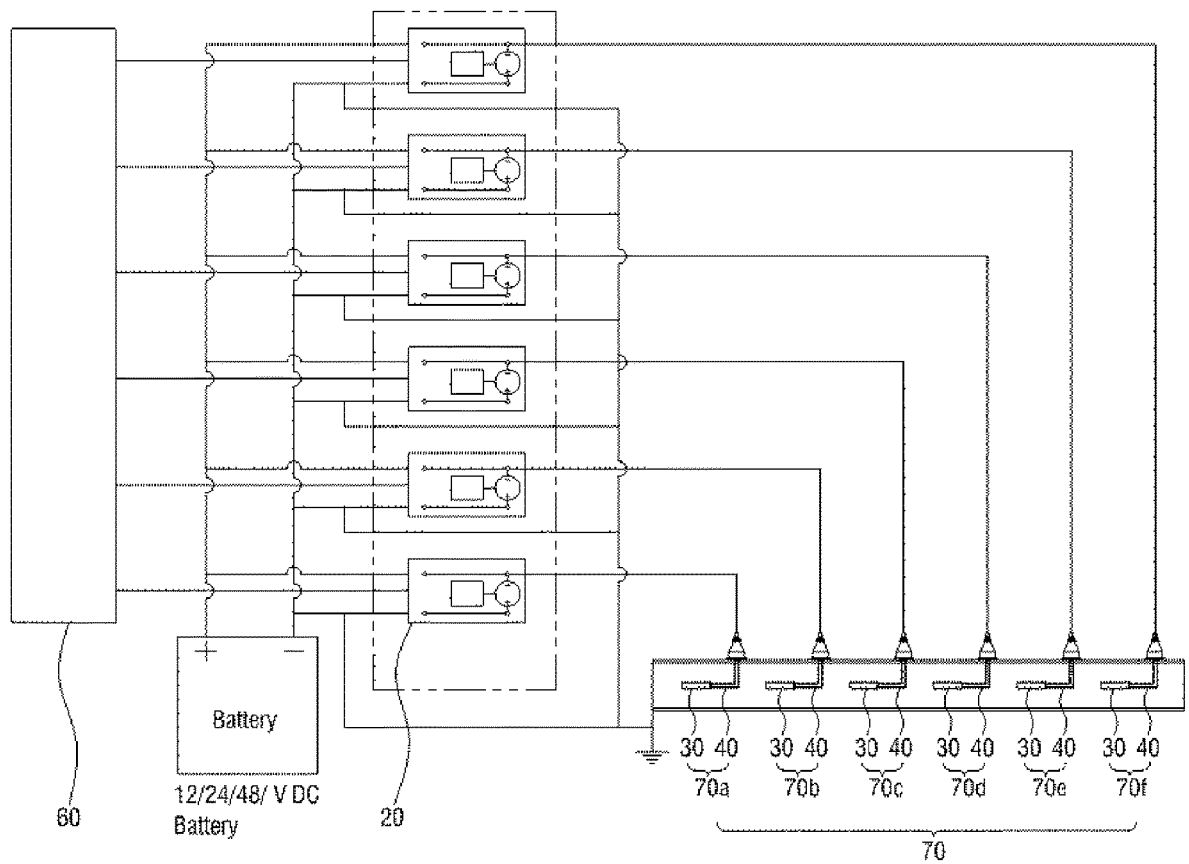
FIGS. 27, 28, 29 and 30 are diagrams illustrating various embodiments including a multiple voltage application unit of the nonthermal plasma-based exhaust gas particulate matter reduction apparatus for preventing the arcing phenomenon according to the present disclosure.
Figure 28:
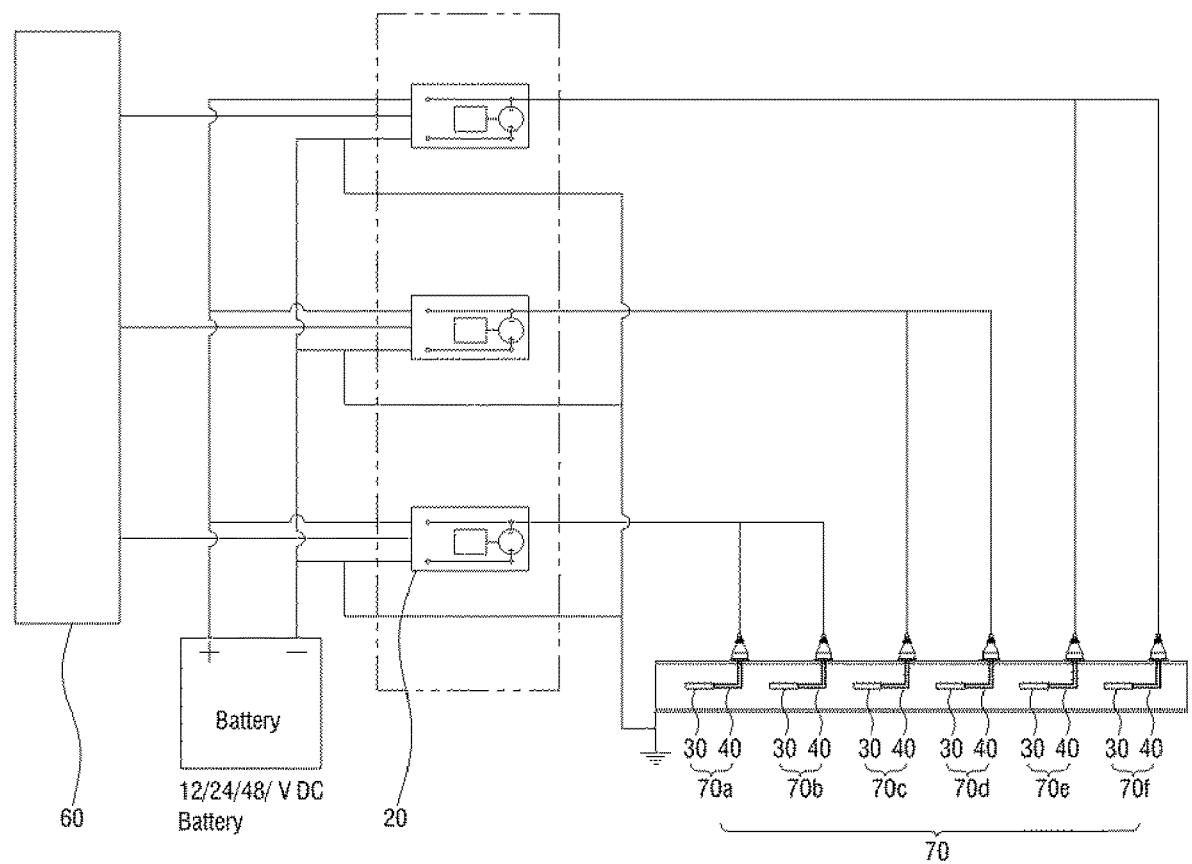

Referring to FIGS. 27 and 28, the plurality of power supply devices 20 is provided, and may be provided so that the power supply devices 20 and the plasma generation units 70a, 70b, 70c, 70d, 70e, and 70f are electrically connected to each other one by one or one power supply device 20 and the plurality of plasma generation units 70a, 70b, 70c, 70d, 70e, and 70f are electrically connected to each other.

Referring to FIG. 28, in the nonthermal plasma-based exhaust gas particulate matter reduction apparatus for preventing the arcing phenomenon, one power supply device 20 may apply a steady-state voltage or a minimum voltage to at least one or more plasma generation units 70a, 70b, 70c, 70d, 70e, and 70f.

In the nonthermal plasma-based exhaust gas particulate matter reduction apparatus for preventing the arcing phenomenon according to the embodiment, the power supply devices 20 may be provided in a minimum quantity.

Figure 29:
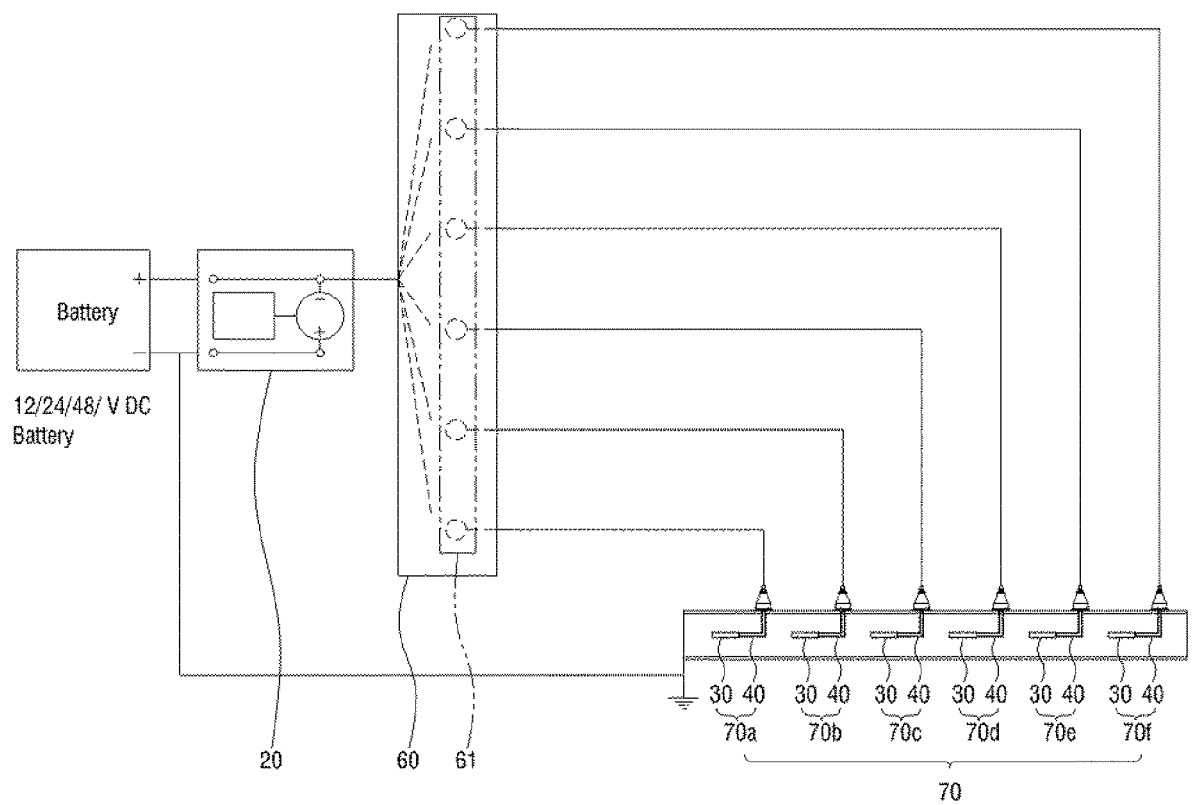
Figure 30:
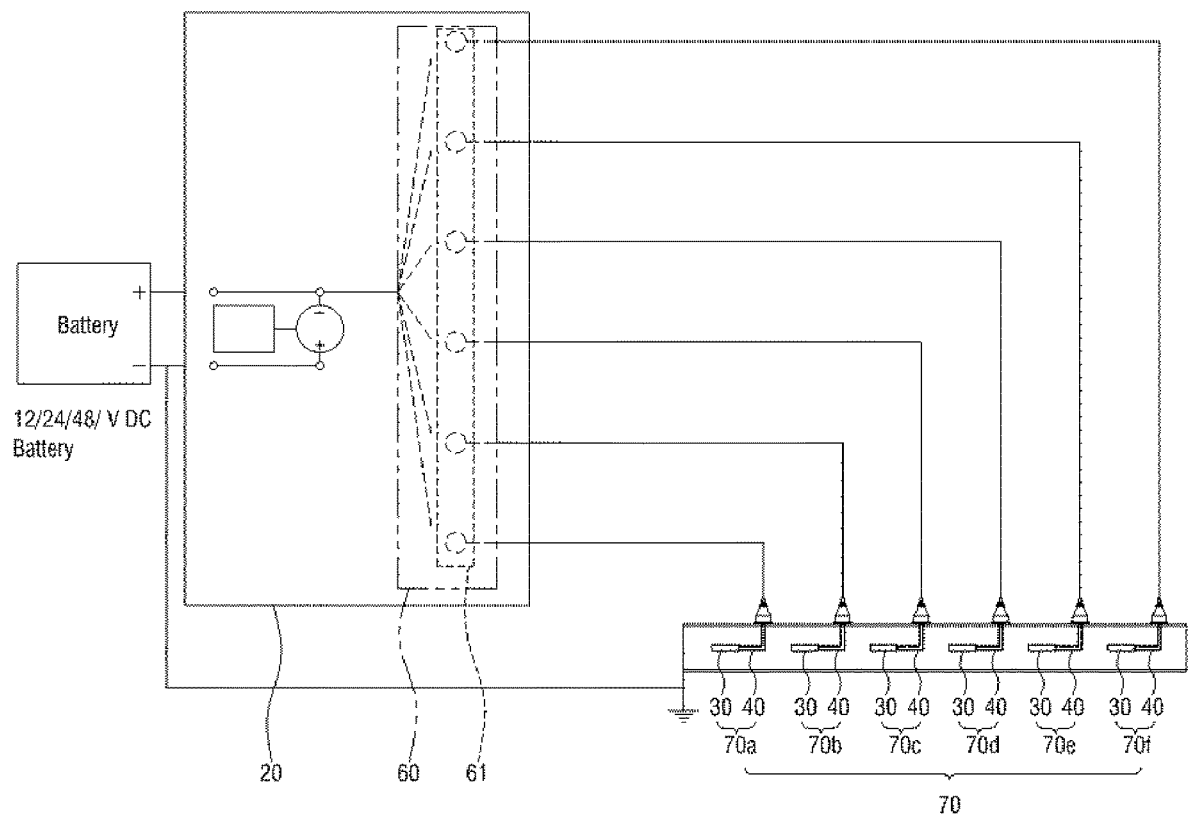

Referring to FIGS. 29 and 30, in the nonthermal plasma-based exhaust gas particulate matter reduction apparatus for preventing the arcing phenomenon according to the embodiment, one side of the multiple voltage application unit 60 is connected to one power supply device 20 and the other side thereof is connected with the plurality of plasma generation units 70a, 70b, 70c, 70d, 70e, and 70f.

In the nonthermal plasma-based exhaust gas particulate matter reduction apparatus for preventing the arcing phenomenon according to the embodiment, the multiple voltage application unit 60 receives the steady-state voltage generated from the power supply device 20 to apply the steady-state voltage to the plurality of plasma generation units 70a, 70b, 70c, 70d, 70e, and 70f.

According to the embodiment, the multiple voltage application unit 60 selectively applies the steady-state voltage and the minimum voltage to the plurality of plasma generation units 70a, 70b, 70c, 70d, 70e, and 70f.

The power supply device 20 according to the embodiment may include the control unit 22 illustrated in FIG. 26 to generate a steady-state voltage and a minimum voltage. At this time, the multiple voltage application unit 60 may selectively apply a steady-state voltage and a minimum voltage generated in time series to the plurality of plasma generation units 70a, 70b, 70c, 70d, 70e, and 70f, respectively.

Alternatively, the multiple voltage application unit 60 according to the embodiment may further include a voltage transformation unit 61 which receives the steady-state voltage to transform the voltage into a minimum voltage.

Further, referring to FIGS. 29 and 30, in the nonthermal plasma-based exhaust gas particulate matter reduction apparatus for preventing the arcing phenomenon according to the embodiment, the multiple voltage application unit 60 may be disposed inside or outside the power supply device 20.

In yet another embodiment of the nonthermal plasma-based exhaust gas particulate matter reduction apparatus for preventing the arcing phenomenon according to the present disclosure, the power supply device 20 supplies a direct current of a constant voltage to fit the diameter of the chamber 10 to most smoothly and continuously generate plasma, thereby maximizing the reduction efficiency of contaminants in the exhaust gas.

Thus, the steady-state voltage and the minimum voltage are determined according to the diameter of the chamber 10.

Table 1 below illustrates a minimum voltage at which a nonthermal plasma phenomenon occurs according to the diameter of the chamber 10 and a range of a steady-state voltage at which reduction efficiency of particulate matters in exhaust gas is maximized.

TABLE 1

| Diameter of chamber (±0.5 inch) | Range of steady-state voltage at which reduction efficiency of particulate matters in exhaust gas is maximized | Minimum voltage at which nonthermal plasma phenomenon occurs | Note |
|---|---|---|---|
| 2 inch | 10 to 25 kV DC | 6 k VDC or higher | Within ripple 1% |
| 3 inch | 20 to 35 kV DC | 9 k VDC or higher | |
| 4 inch | 25 to 40 kV DC | 11 k VDC or higher | |
| 5 inch | 30 to 45 kV DC | 13 k VDC or higher | |
| 6 inch | 35 to 55 kV DC | 15 k VDC or higher | |
| 7 inch | 40 to 60 kV DC | 17 k VDC or higher | |
| 8 inch | 45 to 70 kV DC | 19 k VDC or higher | |
| 9 inch | 50 to 80 kV DC | 22 k VDC or higher | |
| 10 inch | 60 to 90 kV DC | 25 k VDC or higher | |

At this time, the emitter 30 is made of a conductor having good conductivity and an outer surface of the emitter 30 may be provided in a tip shape suitable for plasma divergence. In addition, the chamber 10 is made of a conductor having good conductivity, preferably stainless steel, copper, and aluminum.

As seen in Table 1, in the voltage supplied from the power supply device 20, a ripple is preferably maintained within 1%, which is a non-pulsing direct current.

What is claimed is:

1. A nonthermal plasma-based exhaust gas particulate matter reduction apparatus for preventing an arcing phenomenon, the apparatus comprising:
    a chamber which is a tubular body having exhaust gas flowing therein and is connected to a ground power supply;
    a power supply device which is disposed outside the chamber and includes a voltage generator configured to generate a steady-state voltage at which maximum efficiency of a nonthermal plasma phenomenon is generated;
    an emitter disposed inside the chamber and configured to generate nonthermal plasma between the chamber by having the steady-state voltage applied thereto;
    a rod disposed inside the chamber and configured to apply the steady-state voltage to the emitter by electrically connecting the voltage generator and the emitter; and
    an arcing prevention unit configured to prevent an arcing phenomenon from occurring between the rod and the chamber by providing insulation between the rod and the chamber,
    wherein the arcing prevention unit comprises a rod isolation means made of an insulation material,
    wherein the arcing prevention unit includes the insulation material as an insulation film coated on an inner surface of the chamber, including an orthogonal projection of the rod on the inner surface of the chamber, and
    wherein the entire outer surface of the rod disposed inside the chamber is coated by the insulation material.

2. The nonthermal plasma-based exhaust gas particulate matter reduction apparatus of claim 1, wherein the rod isolation means is an insulation coating member which coats an outer surface of the rod to insulate inner and outer portions of the rod.

3. The nonthermal plasma-based exhaust gas particulate matter reduction apparatus of claim 1, wherein the rod isolation means includes the rod therein, is provided as an insulator, and is a linear or curved column of which a cross-sectional shape is at least one of a polygon, a circle, an oval and a polygon having a round vertex.

4. The nonthermal plasma-based exhaust gas particulate matter reduction apparatus of claim 1, wherein the power supply device includes a control unit controlling the voltage generator, and
    the control unit controls the voltage generator to operate in an arcing suppression mode of mitigating arcing occurrence by generating a minimum voltage at which a nonthermal plasma phenomenon occurs between the emitter and the chamber.

5. The nonthermal plasma-based exhaust gas particulate matter reduction apparatus of claim 4, wherein the power supply device further includes an arcing sensing means which senses the arcing phenomenon to generate an arcing occurrence signal, and
    the control unit controls the voltage generator to operate in the arcing suppression mode according to the arcing occurrence signal.

6. The nonthermal plasma-based exhaust gas particulate matter reduction apparatus of claim 4, further comprising:
    a plasma generation unit consisting of the rod and the emitter;
    a multiple plasma generation unit in which a plurality of the plasma generation units are disposed; and
    a multiple voltage applicator which controls a magnitude of a voltage applied to the plurality of the plasma generation units.

7. The nonthermal plasma-based exhaust gas particulate matter reduction apparatus of claim 6, wherein a plurality of the power supply devices is provided and the plurality of the power supply devices and the plurality of the plasma generation units are electrically connected to each other one by one, or wherein the power supply device and the plurality of the plasma generation units are electrically connected to each other.

8. The nonthermal plasma-based exhaust gas particulate matter reduction apparatus of claim 6, wherein a first side of the multiple voltage applicator is connected with the power supply device and a second side of the multiple voltage applicator is connected with the multiple plasma generation unit.

9. The nonthermal plasma-based exhaust gas particulate matter reduction apparatus of claim 8, wherein the multiple voltage applicator further includes a voltage transformation unit which receives the steady-state voltage from the power supply device to transform the steady-state voltage into the minimum voltage.

10. The nonthermal plasma-based exhaust gas particulate matter reduction apparatus of claim 6, wherein the multiple voltage applicator is connected to a first side of the power supply device and the multiple plasma generation unit is connected to a second side of the power supply device.

11. The nonthermal plasma-based exhaust gas particulate matter reduction apparatus of claim 1, wherein a surface of the arcing prevention unit is coated with a photocatalyst to interfere with adsorption of fine soot included in the exhaust gas by reacting with ultraviolet rays emitted from the nonthermal plasma.

12. The nonthermal plasma-based exhaust gas particulate matter reduction apparatus of claim 1, wherein a surface of the arcing prevention unit is coated with an anti-chemical modification coating agent to prevent the arcing prevention unit from being modified due to a chemical reaction with a contaminant in the exhaust gas.

\* \* \* \* \*